Nov. 4, 1947.  M. O'FARRELL ET AL  2,430,361
AIR LINE OILER
Filed Aug. 28, 1944
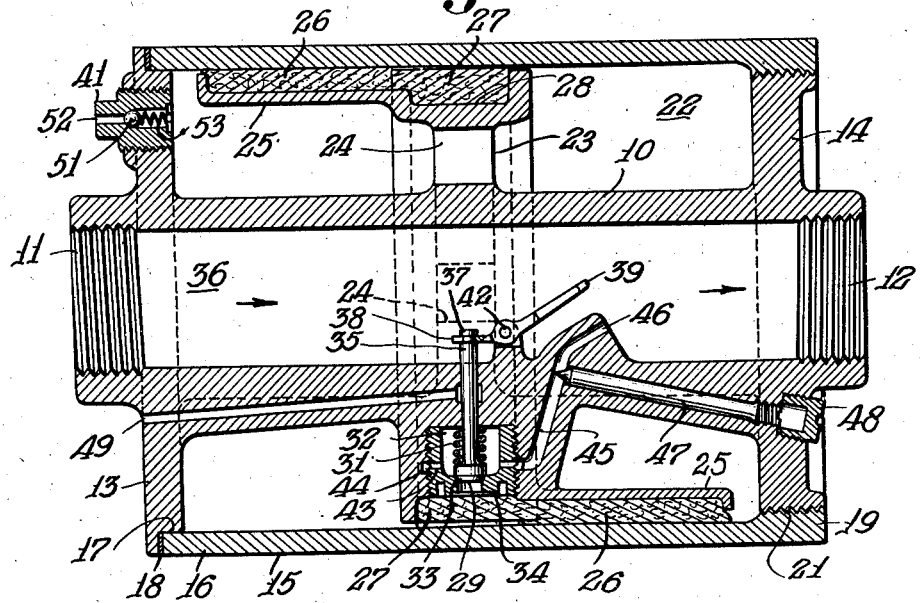
Fig. 1.
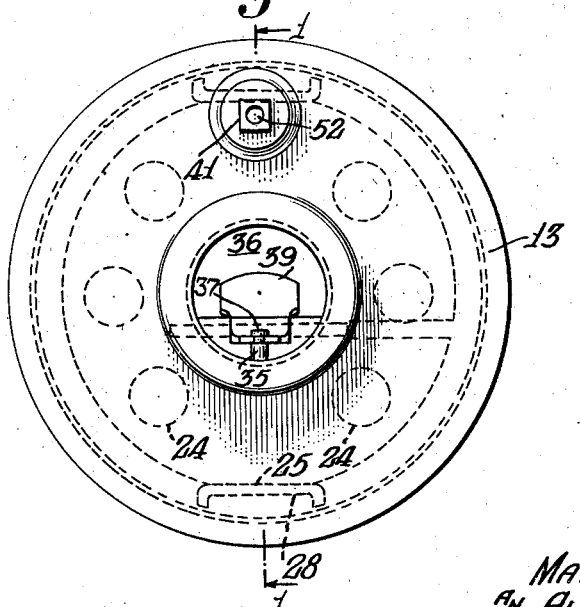
Fig. 2.
Fig. 3.
Inventor
MATTHEW O'FARRELL
AND ALFRED J. ST. LOUIS
By Raymond G. Mullee
Attorney Patented Nov. 4, 1947

2,430,361

UNITED STATES PATENT OFFICE 2,430,361

AIR-LINE OILER

Matthew O'Farrell, Detroit, Mich., and Alfred J. St. Louis, Windsor, Ontario, Canada, assignors to Chicago Pneumatic Tool Company, New York, N. Y., a corporation of New Jersey Application August 28, 1944, Serial No. 551,554

5 Claims. (Cl. 184—55)

This invention relates to lubricating devices and particularly to improvements in such devices known as air line oilers for feeding lubricant to the compressed air line leading to tools and apparatus driven by compressed air.

The main object of the invention is to provide automatic means for supplying lubricant economically to the air line used on pneumatically operated tools such as rock drills, hammers, etc.

In conventional designs of devices intended for the present purpose, there is constant communication between the oil reservoir and the passage through which the air flows to the tool. However restricted this communication may be, when the tool is stopped, static air pressure within the air passage seeps through and builds up an equal pressure within the oil reservoir. When the tool is started, the pressure within the air passage drops, due to the velocity of the air, with the result that an excessive amount of lubricant is displaced from the oil reservoir into the air stream under the pressure previously built up in the reservoir.

In order to overcome the disadvantages of prior designs, the present invention has for an additional object the provision of a lubricating device of the indicated character which is designed to effectively eliminate any pressure above atmosphere within the tool reservoir at all times, with no communication existing between the oil reservoir and the air passage except at the time when the air is in motion and the tool actually operating.

Other objects and the advantages of the invention will appear in further detail in the following specification and noted in conjunction with the accompanying drawing in which:

Fig. 1 is a sectional view of an air line oiler embodying the invention in practical form, the view being a longitudinal section taken on line 1—1 in Fig. 2;

Fig. 2 is an end view of the oiler of Fig. 1 as seen from the left side in the latter view; and Fig. 3 is a plan view of a vane member of the oiler, together with its supporting pin.

In the illustrative embodiment of the invention, a tubular member 10 has both ends 11 and 12 internally threaded for connecting the device serially into the air supply line of the pneumatic tool to be lubricated, said member being also provided exteriorly near the ends 11 and 12 with a pair of integral flanges 13, 14. An outer cylindrical shell or tube 15 at one end 16 seats in a peripheral recess 17 in flange 13 and engages against a gasket 18 to render the resulting joint oil-tight. At the other end 19 the shell 15 is internally threaded to engage with the peripheral thread 21 on flange 14, the shell enclosing an oil chamber or reservoir 22 surrounding member 10.

Intermediate the ends of the tubular member 10 a partition wall or flange 23 divides the reservoir in two but provides communication between the two portions thereof through a plurality of apertures 24. The partition or flange 23 serves as a support for a plurality of channel-shaped legs 25 extending alternately in opposite directions within outer shell 15 and provided with a strip of wicking 26 seated between each leg and the outer shell or bounding wall. The wicking strips occupying the channel portions of legs 25 are connected with each other by the annular strip of wicking 27 surrounding partition or flange 23 and occupying a continuous annular channel or groove 28 therein.

In one portion of the partition is a valve 29 normally pressed by valve spring 31 in valve chamber 32 against valve seat 33 within valve cap 34 which is screwed into the partition. The stem 35 of the valve extends radially inward into the central passage 36 in tubular member 10 and terminates in a head 37 beneath which the lugs 38 engage which form a forked end on the inclined vane 39 disposed in the path of the pressure fluid in said passage 36. The valve seat 33 communicates below directly with the wicking 27 which forms a porous covering therefor.

Noting the operation of the device, the reservoir 22 is filled with lubricant through filler plug 41. Motive fluid on its way to the working tool travels through passage 36 in the direction of the arrows. This motive fluid impinges at a high velocity on vane 39 which fulcrums on hinge pin 42. Vane 39 is of such predetermined area and tilted at such an angle that the pressure resulting from the flow of the motive fluid in passage 36 will tend to force the vane to a position on its fulcrum pin in which it will lie substantially parallel with the air stream in said passage. By reason of this partial rotation of vane 39, valve 29 will be lifted off its seat 33 against the action of its spring 31 and oil reservoir 22 will now be in communication with air passage 36 through ports 43 in the valve cap, around annular groove 44 and through port 45. The latter terminates in an outlet port 46, directed to discharge the lubricating oil down-stream with reference to the air passage 36.

Ports 43 and 45 and groove 44 being partially evacuated by the atomizer effect of the air stream on outlet port 46, the lubricant that has been carried to the valve opening by the wicking 26 which is disposed along the lateral legs 25, will be sucked through these ports and carried away by the air stream travelling through passage 36.

In order that the size of the lubricant passage may be adjusted, a tapered pin 47 is provided which is capable of being advanced or retracted with a screw driver. Pin 47 is covered with a closure plug 48 to protect said pin in attained adjustment.

When the working tool is stopped, pressure in passage 36 will become static, thus equalizing pressures on both faces of vane 39. Through the agency of spring 31, valve 29 will be returned to its seat 33, thus cutting off all communication between air passage 36 and oil reservoir 22.

In order to prevent the possibility of leakage past the stem 35 of valve 29 and consequent interference with the evacuating effect in ports 43 and 45, a bleed passage 49 is provided leading to atmosphere. As the outflow of lubricant from the reservoir tends to create a pressure lower than that of the atmosphere, a check valve 51 embodied in filler plug 41 allows the inflow of air from the atmosphere through passage 52 to compensate for this loss and thus establish equilibrium, spring 53 maintaining valve 51 normally in closed position.

What is claimed is:

1. In a pressure fluid line lubricator, a hollow casing containing an elongated tubular member secured in spaced relation within the bounding walls of the casing to provide a reservoir for lubricant between said walls and said tubular member, the latter extending horizontally through the ends of the casing and having a freely open fluid passage extending therethrough for conducting the pressure fluid of the line through the lubricant, a passage means interconnecting the fluid passage and the reservoir surrounding the latter, control means including a shiftable valve capable of controlling the flow of lubricant from said reservoir through the passage means to said fluid passage, said valve extending vertically and radially with respect to the tubular member, the lower end of the valve being adapted to rest on a valve seat for cutting off the flow of lubricant, the upper end of the valve projecting into the fluid passage, a vane member operably connected to said valve and movably mounted in a portion of said fluid passage, said vane having a horizontal pivot extending transverse to the valve and located downstream from the latter, and also having a pressure surface which is on the downstream side of the pivot and which normally inclines upwardly and away from the pivot, said pressure surface being positioned to be impinged upon by the stream of fluid through said fluid passage whereby the vane is adapted to be moved from initial position and thereby lift said valve off its seat in response to the flow of pressure fluid through the latter passage past said vane member, and yieldable means constantly urging the valve downward for closing the valve when the pressure fluid ceases to flow through said fluid passage and act on said vane member.

2. A fluid pressure line lubricator according to claim 1 in which the operative connection between the vane and the valve comprises a head at the upper end of the valve cooperating with an arm on the vane, the arm extending from the pivot and being forked at its free end to straddle the valve below the head.

3. In an air line lubricator, a casing containing a hollow interior member rigidly secured in said casing and having a freely open fluid passage extending through the ends of said casing for conducting the pressure fluid of the line through the lubricator, a reservoir for lubricant disposed within said casing exteriorly of said hollow interior member, passage means interconnecting the fluid passage within the latter member with the reservoir, control means including a shiftable valve capable of controlling the flow of lubricant from the reservoir through the passage means to the fluid passage, yieldable means normally maintaining the valve in a closed position, a movable vane member pivotally mounted in a portion of the fluid passage in initial projecting position with respect to the pressure fluid flowing therethrough and adapted to be moved toward parallelism with said fluid passage in response to the flow of the pressure fluid through said fluid passage, connecting means between the vane and the valve for opening the latter upon movement of the valve toward parallelism, said vane member tending to return to initial position and allowing said valve to close when the pressure fluid ceases to flow through said fluid passage, support means mounted upon the hollow interior member, said support means comprising a grooved support member extending within predetermined portions of the bounding walls of the casing and having a portion forming a valve casing with a valve seat for the valve disposed within the grooved portion of said support member, and porous wicking material occupying said grooved portion of the latter member adjacent to said bounding walls and disposed between the latter and said valve, the passage means for the lubricant terminating down-stream in the wake of the pressure fluid passing the vane member in said fluid passage.

4. In a pressure fluid line lubricator, a hollow casing containing an elongated tubular member secured in spaced relation within the bounding walls of the casing to provide a reservoir for lubricant between said walls and said tubular member, the latter extending through the ends of the casing and having a freely open fluid passage extending therethrough for conducting the pressure fluid of the line through the lubricant, a passage means interconnecting the fluid passage and the reservoir surrounding the latter, control means including a shiftable valve capable of controlling the flow of lubricant from said reservoir through the passage means to said fluid passage, a vane member operably connected to said valve and movably mounted in a portion of said fluid passage in effective position to be moved from initial position and thereby open said valve in response to the flow of pressure fluid through the latter passage past said vane member, means for closing the valve when the pressure fluid ceases to flow through said fluid passage and act on said vane member, support means fixed on the tubular member and comprising an annular support member surrounding said tubular member, one or more lateral arms extending rigidly from said support member along the inside of the bounding walls of the casing, a portion forming a valve casing with a valve seat for the valve within the periphery of said support member, and porous wicking material disposed upon the periphery and the one or more arms of the support member adjacent to said bounding walls and disposed between the latter and said valve.

5. In a pressure fluid line lubricator, a hollow casing containing an elongated tubular member secured in spaced relation within the bounding walls of the casing to provide a reservoir for lubricant between said walls and said tubular member, the latter extending through the ends of the casing and having a freely open fluid passage extending therethrough for conducting the pressure fluid of the line through the lubricant, a passage means interconnecting the fluid passage and the reservoir surrounding the latter, control means including a shiftable valve capable of controlling the flow of lubricant from said reservoir through the passage means to said fluid passage, a vane member operably connected to said valve and movably mounted in a portion of said fluid passage in effective position to be moved from initial position and thereby open said valve in response to the flow of pressure fluid through the latter passage past said vane member, means for closing the valve when the pressure fluid ceases to flow through said fluid passage and act on said vane member, support means fixed on the tubular member and comprising an annular support member surrounding said tubular member and substantially forming a partition dividing the reservoir into two chambers, the portions of said reservoir communicating with each other through one or more openings in the partition, a plurality of lateral arms extending rigidly in opposite directions from said partition individually into the reservoir chambers along the bounding walls of the latter, said partition having a valve casing and valve seat for the valve, and porous wicking material disposed upon said partition and lateral arms adjacent to said bounding walls and disposed between the latter and said valve.

MATTHEW O'FARRELL.
ALFRED J. ST. LOUIS.

REFERENCES CITED

The following references are of record in the file of this patent:

UNITED STATES PATENTS

| Number | Name | Date |
|---|---|---|
| 1,529,931 | Smith | Mar. 17, 1925 |
| 1,600,262 | Wickham | Sept. 21, 1926 |
| 1,783,522 | Renfer | Dec. 2, 1930 |
| 2,105,491 | Huffman | Jan. 18, 1938 |
| 2,105,492 | Gartin | Jan. 18, 1938 |
| 2,352,826 | Finch | July 4, 1944 |

FOREIGN PATENTS

| Number | Country | Date |
|---|---|---|
| 424,387 | Germany | Jan. 25, 1926 |
| 428,507 | Germany | May 6, 1926 |